INVENTOR.
WILHELM VUTZ.

UNITED STATES PATENT OFFICE 2,630,064

HAY BALER

Wilhelm Vutz, Coldwater, Ohio, assignor to Avco Manufacturing Corporation, Cincinnati, Ohio, a corporation of Delaware Application January 8, 1949, Serial No. 69,921

6 Claims. (Cl. 100—142)

This invention relates to a baling machine and more particularly to improvements in baling machines of the type adapted for baling hay and other similar materials.

The invention is particularly concerned with baling machines of the type which includes a pickup assembly, a baler unit, and a conveyor system therebetween adapted to deliver hay or other material from the pickup assembly to the opening to the bale chamber. This type of machine is adapted to pick up cut material from the field and deliver such material to the bale chamber, where it is compressed and securely bound into bales. In such machines, the amount of material fed to the bale chamber in a given period of time varies over a wide degree. Consequently, the rate of feed to the bale chamber opening is not uniform and at certain times matting of the material and blocking of the opening to the bale chamber occurs. Specifically, in conventional machines the material is not positively forced into the bale chamber and under certain conditions of operation, for example, when an unusually large block of material is delivered to the bale opening, the material is only partially fed through the opening and into the bale chamber with consequent non-uniformity of the bale being formed and undesirable blocking of the entrance to the bale chamber.

An object of this invention is to provide an improved feed mechanism for a baling machine whereby positive feed of material into the bale chamber is assured and jamming of the entrance to the bale chamber prevented.

Another object of this invention is to provide an improved cut-off mechanism for a baling machine whereby that portion of the material extending into the bale chamber may be cut off from that portion of the material adjacent the bale chamber but external thereof.

A particular object of this invention is to provide a baling machine having means adapted to extend through and be withdrawn from the opening leading to the bale chamber whereby material to be baled is positively forced through the opening and compacted into the interior of the bale chamber.

A further object of this invention is to provide a baling machine having a drum mounted adjacent the opening to the bale chamber and means responsive to movement of the plunger within the chamber for moving the drum through and withdrawing the drum from said opening whereby material to be baled is positively forced through said opening into the bale chamber.

These and other objects of this invention will be apparent from the following description and claims taken in conjunction with the accompanying drawings in which:

Figure 1:
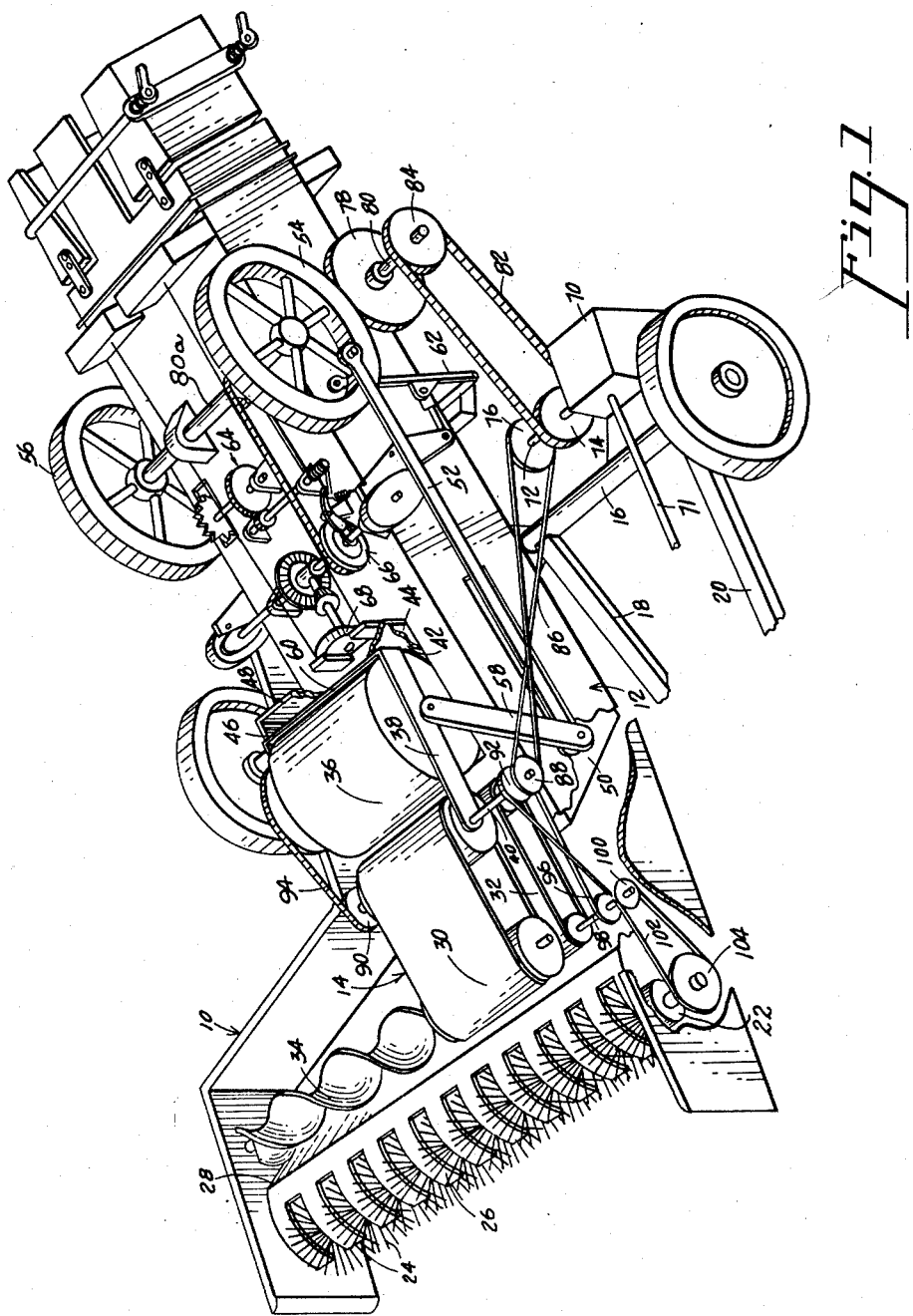
Fig. 1 is a perspective view of a baling machine embodying this invention.

Referring now to the drawings, Fig. 1 illustrates a baling mechanism having a pickup assembly 10, a bale case 12, and a feeder or conveyor system 14 therebetween, all supported for movement on a wheeled axle 16 having a draft tongue comprising elements 18 and 20. The pickup assembly includes a conventional driven pickup drum 22 having spaced collecting fingers 24 thereon for cooperation with stripper bars 26 provided on the forward end of a feeder apron 28.

The feeder mechanism 14 comprises upper and lower conveyors 30 and 32 respectively, a feed auger 34, and a drum 36 rotatably mounted on a pair of guides or supports 38 which in turn are pivotally mounted on shaft 40 of conveyor 30. The conveyors 30 and 32 are adapted to discharge into bale case 12 through a feed opening 42 defined on each side by walls 44 and 46, and by a back wall 48, provided for cooperation with drum 36 which is mounted to float over the bale case opening 42. A plunger 50 is mounted within the bale case 12 and adapted for reciprocating motion in a compression chamber 12a (see Figs. 2 and 3) being driven by a pair of connecting rods 52 pivotally secured to bull gears 54 and 56. A pair of links 58 join the plunger 50 and the drum support 38 so that drum 36 is raised out of and is inserted into the bale chamber in response to reciprocating motion of the plunger. A scraper 60 travels with drum 36 in its pivotal motion about shaft 40 and prevents spillage of material over wall 48 which otherwise might occur due to rotation of the drum.

Figure 2:
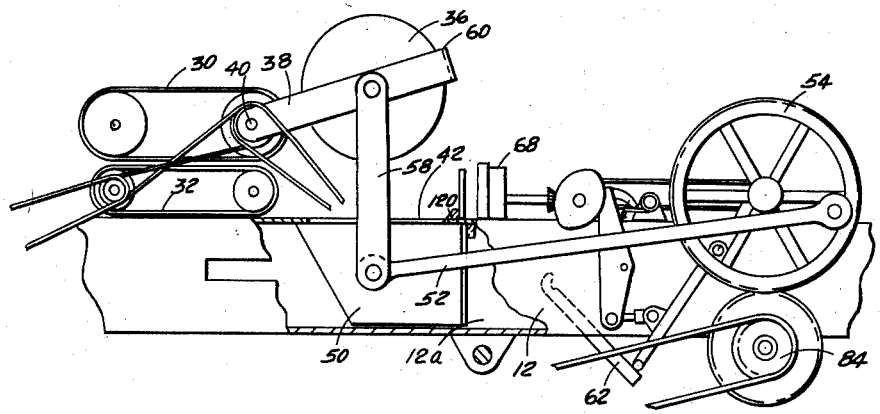
Fig. 2 is a partially sectional side elevation of the baling machine of Fig. 1 illustrating the relative positions of the bale opening and drum when the bale plunger is in its extreme forward position on its compression stroke.
Figure 3:
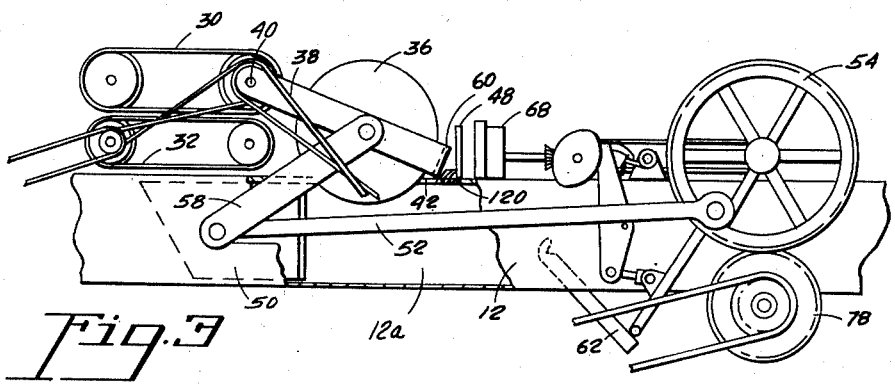
Fig. 3 is a partially sectional elevation of the baling machine of Fig. 1 illustrating the relative positions of the bale opening and drum when the bale plunger is in a completely retracted position so that material may be introduced into the bale chamber.

Drum 36 is rotated in a counterclockwise direction as viewed in Figs. 2 and 3 so that the bottom surface of the drum and the top surface of the plunger cooperate to draw incoming material away from feed conveyors 30 and 32 as the plunger moves towards its compressive position. Drum 36 draws material across the upper surface of plunger 50 even when the adjacent surfaces of the drum and plunger are moving in opposite directions so that the drum counteracts any tendency of the upper surface of the plunger to bunch material adjacent the ends of the conveyors when the plunger is withdrawn from its compressive position.

Other features indicated generally in Fig. 1 include a bale tying means mounted centrally on the bale case which includes a needle assembly 62, metering and tripping mechanism 64, driving and timing unit 66, and a twister unit 68. The needle assembly, metering and tripping, driving and timing unit and twister unit do not in themselves constitute a part of this invention.

The baling machine is operated by power from a tractor (not shown) delivered to a gear box 70 through a shaft 71. The gear box is provided with a driven shaft 72 carrying a sprocket 74 and a pulley 76. Sprocket 74 drivingly engages chain 82 which is also engaged with a sprocket 84 secured to a transverse drive shaft 80. A pair of pinions 78 are also secured to shaft 80 in position to mesh with bull gears 54 and 56, the bull gears being secured to another transverse shaft 80a.

The pulley 76 is connected to drive the upper conveyor 30 through a belt 86 and pulley 88. The drive shaft 40 of the upper conveyor 30 is provided with a pair of pulleys 90 and 92 to rotate the floating drum 36 and drive the lower conveyor 32 through the belt and pulley assemblies 94 and 96 respectively. Drive shaft 98 of lower conveyor 32 is connected to feed auger 34 and has a pulley 100 connected to drive the pickup drum 22 through a belt 102 and suitable pulley 104.

Figs. 2 and 3 are partially sectional views illustrating the two extreme positions of drum 36 with respect to bale chamber opening 42. In Fig. 2 drum 36 is displaced in its extreme upward position when plunger 50 is in its extreme forward position on the compression stroke. Thus, incoming hay or other material being fed to bale chamber 12 through opening 42 is permitted to pass from conveyors 30 and 32 to the bale opening 42. This material will, of course, be disposed below drum 36 and above plunger 50. No material can enter the bale chamber 12 since the upper surface of plunger 50 blocks off opening 42 from the interior of the chamber. A knife edge 120 is fixed to the bale case adjacent one edge of opening 42. This knife edge extends transversely of the direction of travel of plunger 50 and cooperates with a series of knife edges provided on the leading edge of plunger 50 to cut off the material within the bale chamber from that above opening 42 in a manner more particularly hereinafter explained.

In Fig. 3, drum 36 is illustrated as extending through opening 42 into the bale chamber when plunger 50 is in its fully retracted position. Thus, as plunger 50 is withdrawn from its fully extended position illustrated in Fig. 3, drum 36 is positively pivoted about shaft 40 by means of linkage 58 connecting drum support 38 to drive rod 52. In this manner, material disposed above plunger 50 during the compression stroke of the plunger is positively forced through opening 42 and compacted into the interior of the bale chamber irrespective of any bunching or matting of material above opening 42. Scraper 60, mounted on drum supports 38, travels with drum 36 and effectively prevents undesirable spillage of material over the top of rear wall 48 which otherwise might occur due to rotation of the drum.

Figure 4:
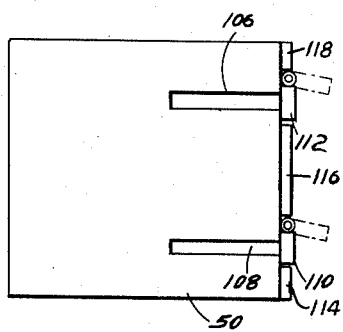
Fig. 4 is a plan view of the plunger shown in Fig. 2.
Figure 5:
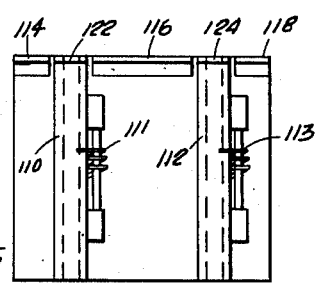
Fig. 5 is an end view of the plunger shown in Fig. 2.

In Figs. 4 and 5 details of plunger 50 are shown. The plunger includes a pair of vertically disposed slots 106 and 108 positioned in the plunger to be parallel to the direction of travel thereof. These slots are each adapted to receive one of the spaced needles of needle assembly 62 when the bale is formed and tying thereof is to be accomplished. At such time, the needles extend up through the plunger slots from the bottom of the bale case and feed the binding wires to the twisting mechanism 68. After tying of the bale wires, the wires on the bale are cut from the feed wires in the needles and plunger 50 is withdrawn from the bale while the needles are still positioned within slots 106 and 108. As shown in Figs. 4 and 5, a pair of doors 110 and 112 serve to close off the open ends of slots 106 and 108 respectively. Springs 111 and 113 serve to keep the doors in a normally closed position and at the same time permit opening of the doors upon contact of the doors and wire needles during withdrawal of plunger 50 from its compression position immediately after twisting of the bale wires to tie the bales has been accomplished. A series of knife edges 114, 116 and 118 are provided on the upper leading edge of plunger 50 which, together with knife edges 122 and 124 provided on upper edge of doors 110 and 112, provide an effective cutting edge entirely across the leading edge of the plunger. These knife edges cooperate with the knife edge 120 extending parallel thereto in order to cut material in bale case 12 from that above the plunger and adjacent opening 42 on movement of plunger 50 towards the bale. Doors 110 and 112 serve to prevent the material to be compressed from entering the plunger slots on the forward stroke of the plunger and damaging the wire feed needles within the slots. With the cutting edges described presenting an effective continuous cutting edge entirely across the leading edge of the plunger and the bale chamber, all of the material in alignment with the cutting edges is cut, irrespective of the transverse distribution of the material across the bale chamber opening. In the absence of a continuous cutting edge entirely across the plunger considerable vibration and hammering was experienced upon reciprocation of the plunger. By combining the drum for positively introducing material through the bale chamber opening into the chamber proper and providing a continuous cutting edge entirely across the upper edge of the plunger vibration was greatly minimized and smooth operation achieved.

It will be appreciated by those versed in the art that by use of the present invention matting of material introduced by the conveyors and jamming of the baler feed opening is greatly minimized. Further, with positive introduction of the material into the bale case, a more uniform and compact bale is formed. With the plunger doors and cutting edges described, vibration and jamming of the needles in the plunger slots are practically eliminated.

While a preferred embodiment of this invention has been shown and described, it will be appreciated that various changes and modifications may be made therein without departing from the spirit and scope thereof as set forth in the appended claims.

Having described a preferred embodiment of my invention, I claim:

1. In combination in a baler, a compression chamber formed to define an opening through which material to be baled may be introduced into said chamber, a drum pivotally supported adjacent said chamber for swinging movement towards and away from the opening, means for maintaining a constant supply of material to be baled adjacent said drum, means for continuously rotating said drum whereby said drum feeds the material to the opening in said compression chamber, a reciprocatory plunger slidably disposed within said compression chamber, and means for swinging said drum towards and away from the opening, said last named means being synchronized with the movement of said plunger whereby said drum is moved to positively compact material through the opening of said chamber while said plunger is remote from the opening, said drum being held away from the opening by said last named means while said plunger advances to compress the previously compacted material.

2. In combination in a baler, a compression chamber formed to define an opening through which material to be baled may be introduced into said chamber, a plunger slidably disposed for reciprocation within said compression chamber, said plunger periodically obstructing the chamber opening during its reciprocation, a drum pivotally supported for swinging movement towards and away from the opening, means for continuously providing material to be baled adjacent said drum, means for continuously rotating said drum to feed the material from said first named means to the opening, the material accumulating above the opening while obstructed by said plunger, and a link pivotally connected to said drum and said plunger whereby said drum may be moved towards and away from the opening in timed relationship with the reciprocation of said plunger, the rotation of said drum acting to feed material to the opening, said drum being moved periodically by said link to positively force accumulations of material through the opening into said chamber while the opening is unobstructed by said plunger.

3. In combination in a baler, a compression chamber formed to define an opening through which material may be introduced into said chamber, rotatable drum means adjacent the opening, means for rotating said drum means to feed material to be baled to the opening, a plunger slidably disposed within said compression chamber, means for supporting said drum means for swinging movements towards and away from the opening, and means for imparting controlled swinging movements to said drum means to carry it towards and away from the opening at predetermined times, said means for controlling the movement of said drum means moving said drum means periodically through the opening to compact the material to be baled into said chamber in a positive manner while said plunger is remote from the opening.

4. In combination in a baler, a compression chamber formed to define an opening through which material may be introduced into said chamber, rotatable drum means adjacent the opening, means for imparting rotation to said drum means to feed material to be baled to the opening, a plunger slidably disposed within said compression chamber, said plunger periodically covering and uncovering the opening during its movements, means for swingably supporting said drum means for movement towards and away from the opening, means for imparting controlled swinging movements to said drum means to carry it towards and away from the opening in timed relationship with the movement of said plunger, said means for controlling the movement of said drum means moving said drum means periodically through the opening to positively compact the material to be baled into said chamber, and a scraper carried by said drum supporting means for confining the material as it is compacted into said chamber.

5. In combination in a baler, a compression chamber formed to define an opening through which material to be baled may be introduced into said chamber, a plunger disposed for reciprocation within said compression chamber, said plunger periodically obstructing the chamber opening during its reciprocation, a drum, means for pivotally supporting said drum for swinging movements towards and away from the opening, means for continuously rotating said drum to feed material to the opening, the material accumulating above the opening while obstructed by said plunger, and a link pivotally connected to said drum and said plunger whereby said drum is moved towards and away from the opening in timed relationship with the reciprocation of said plunger, said drum being moved periodically by said link to positively force accumulations of material through the opening into said chamber while the opening is unobstructed by said plunger.

6. In combination in a baler, a compression chamber formed to define an opening through which material to be baled may be introduced into said chamber, a plunger slidably disposed for reciprocation within said chamber, said plunger periodically obstructing the chamber opening during its reciprocation, a drum, means pivotally supporting said drum for movement towards and away from the opening, means for rotating said drum to feed material to the opening, and a link for transferring motion from said plunger to said drum whereby said drum is moved towards and away from the opening in timed relationship with the reciprocation of said plunger, said drum being moved periodically by said link to positively force accumulations of material through the opening into said chamber while the opening is unobstructed by said plunger.

WILHELM VUTZ.

REFERENCES CITED

The following references are of record in the file of this patent:

UNITED STATES PATENTS

| Number | Name | Date |
| --- | --- | --- |
| 301,398 | Slauson | July 1, 1884 |
| 665,191 | Davidson | Jan. 1, 1901 |
| 865,614 | Schubert | Sept. 10, 1907 |
| 907,654 | Tuttle | Dec. 22, 1908 |
| 1,090,137 | Dain | Mar. 17, 1914 |
| 2,362,861 | Russell | Nov. 14, 1944 |
| 2,345,715 | Reed | Apr. 4, 1944 |
| 2,394,996 | Hill | Feb. 19, 1946 |
| 2,477,795 | Gehl | Aug. 2, 1949 |

FOREIGN PATENTS

| Number | Country | Date |
| --- | --- | --- |
| 863,735 | France | Jan. 6, 1941 |
| 873,929 | France | Apr. 13, 1942 |